June 28, 1966 R. A. McMASTERS 3,257,974
PALLET STACKING RACK
Filed May 11, 1964 2 Sheets-Sheet 1
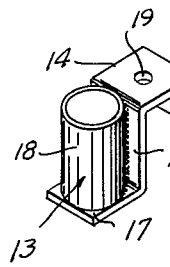
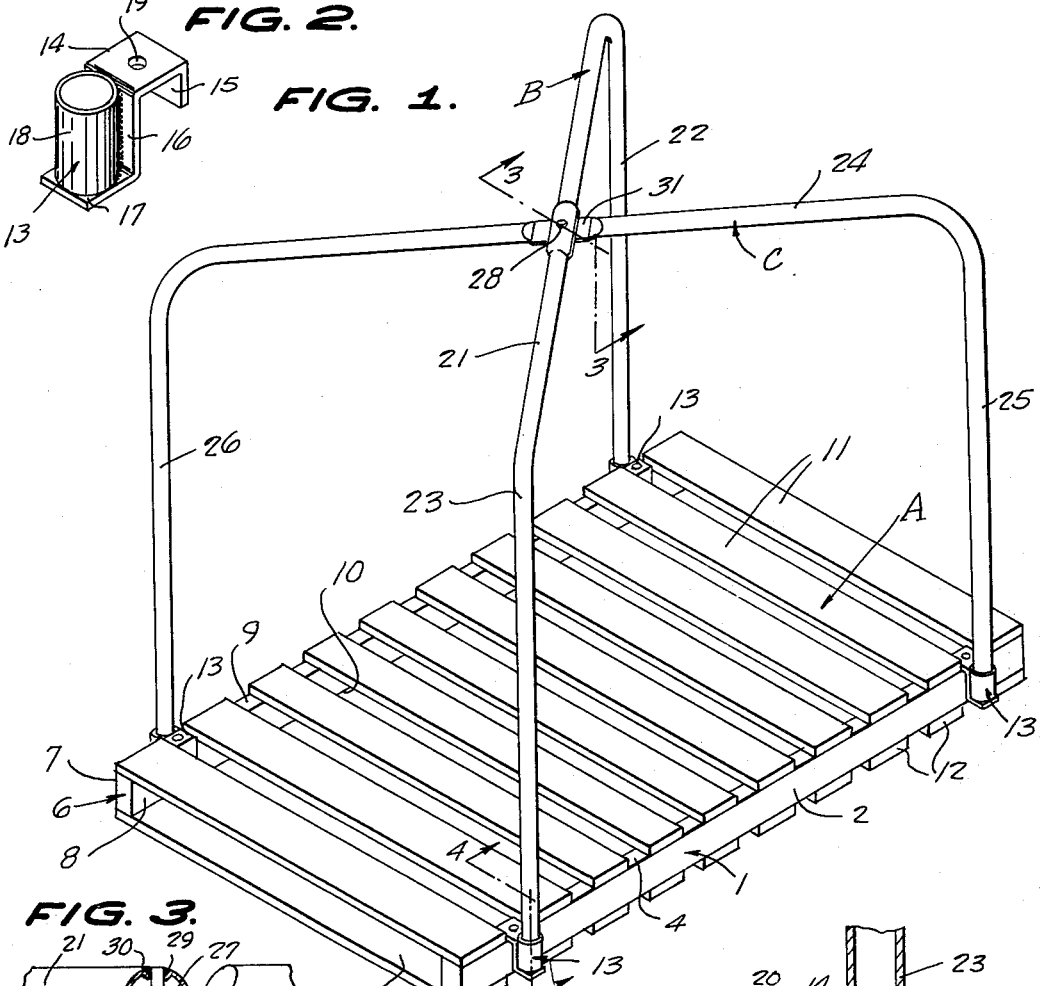
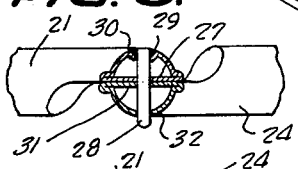
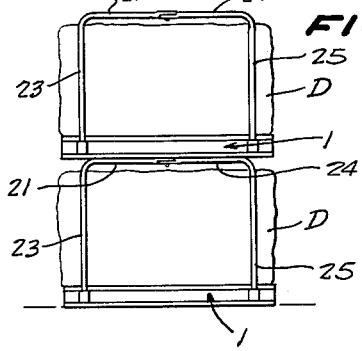
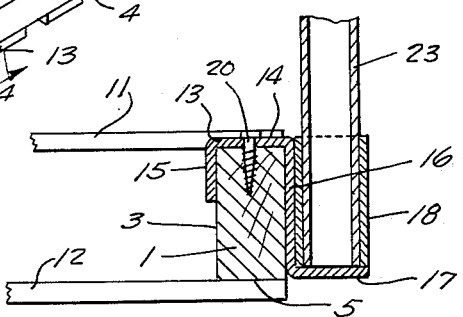
INVENTOR.
ROBERT A. McMASTERS
BY
ATTORNEYS.

June 28, 1966   R. A. McMASTERS   3,257,974
PALLET STACKING RACK
Filed May 11, 1964   2 Sheets-Sheet 2
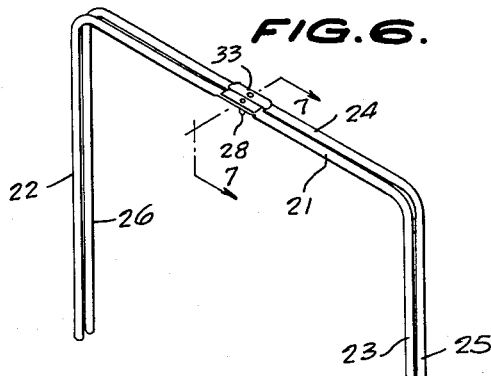
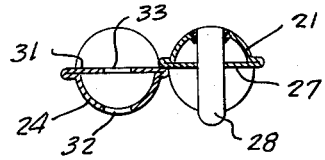
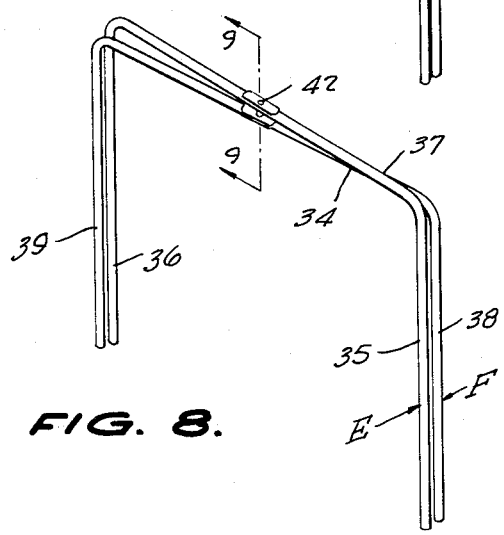
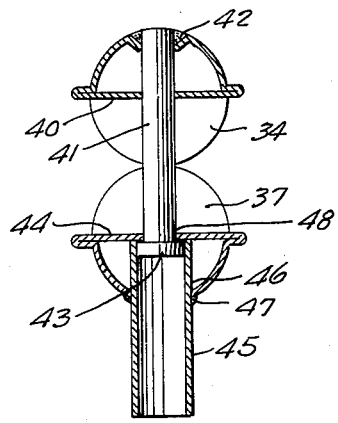
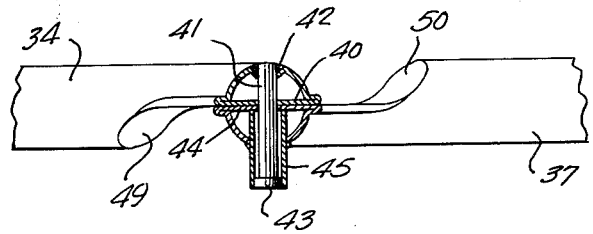
INVENTOR.
ROBERT A. McMASTERS
BY
Linton and Linton
ATTORNEYS.

United States Patent Office 3,257,974
Patented June 28, 1966

3,257,974
PALLET STACKING RACK
Robert A. McMasters, Birmingham, Ala., assignor to Southeastern Metals Company
Filed May 11, 1964, Ser. No. 366,259
4 Claims. (Cl. 108—53)

The present invention is concerned with an improvement in pallets and particularly a pallet including a pallet stacking rack.

The principal object of the present invention is to provide pallets with detachable racks which permits the stacking of such pallets with racks one above the other to conserve space and to protect articles on the pallets and yet which racks can be attached to or separated from the pallets quickly and easily without tools or special knowledge.

A still further and important object of the invention is to provide racks for conventional wooden pallets which racks can be readily mounted on various size pallets leaving the entire top of the pallet clear for storage space and which racks can be quickly taken from one pallet and mounted on a second pallet even where the two pallets are of different sizes.

Another important object of the invention is to provide racks for pallets which can be folded together or placed side by side when detached from the pallets for having a stored position requiring a minimum of space.

Another object of the invention is to provide brackets mountable upon wooden pallets for extending therefrom and supporting racks outside of the load bearing surface of the pallet.

Further objects of the invention will be in part obvious, and in part pointed out in the following detailed description of the accompanying drawings, in which:

FIG. 1 is a perspective view of a pallet with the present brackets and racks thereon.

FIG. 2 is an enlarged perspective view of one of the brackets.

FIG. 3 is an enlarged cross-sectional view taken on line 3—3 of FIG. 1.

FIG. 4 is an enlarged cross-sectional view taken on line 4—4 of FIG. 1.

FIG. 5 is a side elevation on a reduced size of two pallets with goods and the present racks thereon in their stacked position.

FIG. 6 is a perspective view, reduced size, of the rack in its stored position.

FIG. 7 is an enlarged cross-sectional view taken on line 7—7 of FIG. 6.

FIG. 8 is a perspective view of a modified form of rack in its stored position.

FIG. 9 is an enlarged cross-sectional view taken on line 9—9 of FIG. 8.

And FIG. 10 is a further enlarged detailed cross-sectional view of said modified form of rack in its pivoting position.

Referring now more particularly to the accompanying drawings in which like and corresponding parts are designated by similar reference characters, A generally indicates a conventional wooden pallet having a stringer 1 with an outer side 2, inner side 3, top 4 and bottom 5, a second stringer 6 having an outer side 7, inner side 8, top 9 and bottom 10, a series of parallel top boards 11 spaced apart along and fastened to tops 4 and 9 of said stringers by conventional means such as nails and screws and a series of parallel bottom boards 12 spaced apart along and fastened to bottoms 5 and 10 of said stringers also by conventional means. The ends of boards 11 and 12 are flush with outsides 2 and 7 of said stringers and said stringers are in turn spaced apart and positioned parallel to one another by said boards.

A plurality of brackets 13 are mounted on said pallet. Each bracket has a flat top 14, end leg 15, intermediate leg 16, a bottom flange 17 and tube 18 fixedly mounted on bottom flange 17 by welding to said bottom flange and leg 16. Said flat top, end leg and intermediate leg have a J-shaped cross-sectional configuration with said legs being parallel and normal to said flat top and spaced apart a distance for slidably receiving either stringer 1 or 6 therebetween as shown in FIG. 4. Bottom flange 17 is parallel to top 14. Said flat top has a width to fit between a pair of said boards 11 and an opening 19 therein for the passage of a screw 20 therethrough into the stringer therebeneath.

A pair of rod-like or tubular frames B and C provide a rack. Frame B has an elongated straight base 21 with a pair of similar length legs 22 and 23 extending normal thereto from the opposite ends of said base. Frame C has an elongated straight base 24 with a pair of similar length legs 25 and 26 extending normal thereto from the opposite ends of said base. The free ends of legs 22, 23, 25 and 26 are each of a diameter for being slideably inserted in the bore of a tube 18.

Base 21 has the medial portion thereof flattened to a semi-circular cross-section providing a flat face 27 at said medial portion. A pin 28 extends through the middle of said base 21 at opening 29 perpendicular to face 27 and has its inner end welded at 30 to said base.

Base 24 has the medial portion thereof flattened to a semi-circular cross-section providing a flat face 31 at said medial portion. Openings 32 and 33 extend through said medial portion of base 24 with an axis on a line normal to face 31 and with a diameter for slideably receiving pin 28 therethrough.

Face 27 is on the inner side of base 21 while face 31 is on the outer side of base 24 and each face is in a plane perpendicular to the longitudinal axis of the legs of their respective frame.

In the use of the present pallet stacking rack four brackets 13 are mounted on the stringers, that is two brackets on stringer 1 each adjacent an end thereof and two brackets on stringer 6, each adjacent an end of that stringer. For this purpose each bracket is mounted by inserting the stringer between the legs 15 and 16 until bottom 14 rests on top 4 or 9 of the stringer and then a screw 20 is inserted through opening 19 in top 14 and into the stringer as shown in FIG. 4. Leg 25 is inserted in one tube 18 until it rests on bottom 17 and leg 26 is mounted in the tube 18 diagonally opposite to the tube containing leg 25. Legs 22 and 23 are inserted in the remaining diagonally opposite tubes 18 until pin 28 is extending through openings 32 and 33 of base 24. Various types of objects D can be placed on the bearing surface A provided by boards 11 with the entire surface A being clear for this purpose. As shown in FIG. 5 pallets so loaded can be mounted one on top of the other by placing boards 12 of one pallet on bases 21 and 24 of the pallet supporting frame of a lower pallet.

When not in use legs 22, 23, 25 and 26, can be withdrawn from their respective tubes 18 and pin 28 withdrawn from base 24 whereupon the two frame members can be stored side by side if desired as shown in FIG. 6 until they are to be used.

When pin 28 is in base 24 said bases 21 and 24 can be pivoted about pin 28 to fit brackets 13 mounted on any one of various sized pallets as required.

A modified form of pallet supporting frame is shown in FIGS. 7 to 10, inclusive which consists of two U-shaped members E and F. Member E has a base 34 with a pair of legs 35 and 36 extending normal to that base. Both bases 34 and 37 have flattened medial portions each a semi-circular cross-sectional configuration. Base 34 has a flat inner medial face 40 slidably positioned on the flat upper medial face of base 37. Said faces 40 and 44 are each in a plane perpendicular to the longitudinal axis of their member legs.

A pin 41 is welded at one end to base 34 at 42 and extends through and normal to face 40. Said pin 41 further slideably extends through opening 48 in face 44 into the bore of tube 45 which tube extends through opening 46 in the bottom of base 37 and is welded thereto at 47. Said tube 45 further abuts face 44 around opening 48 and extends normal to face 44. Pin 44 has a cylindrical head 43 slideably longitudinally of the bore of tube 45 and said head is of a larger diameter than opening 48 in face 44 so that said pin head cannot be drawn through opening 48. Thus member E is pivotally connected to member F at their middle by pin 41 and can be separated a short distance as shown in FIG. 10, and the length of pin 41 is sufficient to allow base 34 to be above the top of base 37 to permit the full pivoting of said bases until their legs abut as shown in FIG. 8.

The use of frame E–F is the same as frame B–C except that members E and F cannot be fully separated. Thus, legs 35, 36, 38 and 39 are to be inserted in tubes 18 of brackets 13 in the manner shown for frame B–C in FIG. 1 and pallets loaded or unloaded likewise positioned on top of each frame E–F in the same manner as shown in FIG. 5. Members E and F can be pivoted about pin 41 a distance limited by the length of faces 40 and 44 until shoulders 49 and 50 abut stopping further pivoting of said members so that they can be readily mounted on anyone of a number of various size pallets.

When it is desired to store frame E–F its legs are withdrawn from tubes 18 and base 34 is raised from base 37 as shown in FIG. 10 until pin head 43 abuts face 44 whereupon said members E and F can be further pivoted until side by side as shown in FIG. 8.

Brackets 13 and members B, C, E, and F are preferably formed of a metal or plastic and said members are of a rod-like or tubular material.

The present invention is capable of considerable modification and such changes thereto as come within the scope of the appended claims is deemed to a part thereto.

I claim:

1. A pallet for supporting frame for being mounted on pallet stringers comprising a plurality of brackets, each bracket consisting of a base, a pair of spaced apart legs extending normal to and from said base, a flange extending normal to and from one of said legs and a tube fixedly connected to on of said legs and said flange and a pair of inverted U-shaped members pivotally connected at their medial portions and each having an end thereof slideably inserted in one of said bracket tubes.

2. A bracket for pallet supporting frames, comprising a flat base, a pair of straight spaced apart legs each extending from and normal to said base, a straight bottom flange extending laterally from one of said legs and a member fixedly mounted on said bottom flange and one of said legs and having an opening whose axis extends normal to said bottom flange.

3. A pallet comprising a pair of stringers, a plurality of spaced apart boards fixedly mounted on said stringer laterally thereof, a plurality of brackets detachably mounted on said stringers, each of said brackets consisting of a base and a pair of legs together having a J-shaped configuration and embracing one of said stringers between a pair of said boards with said base mounted on top of said one of said stringers, a bottom flange extending laterally from one of said legs and a tube fixedly mounted on said bottom flange and longitudinally of one of said legs, a pair of frame members each having a base and a pair of legs with each leg slideably mounted in one of said bracket tubes and a pin extending through said member bases pivotally connecting the same and also extending in a plane parallel to the longitudinal axis of said member legs.

4. A pallet comprising a pair of stringers, a plurality of spaced apart boards fixedly mounted on said stringers laterally thereof, a plurality of brackets detachably mounted on said stringers, each of said brackets consisting of a base and a pair of legs embracing one of said stringers between a pair of said boards with said base mounted on top of said one of said stringers and a tube fixedly connected to and extending longitudinally of one of said legs, a pair of frame members each having a base and a pair of legs with each leg slideably mounted in one of said bracket tubes, a pin extending through said member bases pivotally connecting the same and also extending in a plane parallel to the longitudinal axis of said member legs, said frame member bases having semicircular medial portions of a semi-circular cross-section with flat faces being slideably superimposed and having coinciding openings, and said pin being fixedly connected to one member base and extending through said face openings normal to said faces.

References Cited by the Examiner

UNITED STATES PATENTS

| 789,519 | 5/1905 | Zeisinger | 248—214 X |
| 2,665,103 | 1/1954 | Flora et al. | 248—314 |
| 2,686,645 | 8/1954 | Whitehurst et al. | 108—53 |
| 2,700,520 | 1/1955 | Skuhie | 108—53 |
| 2,924,339 | 2/1960 | Skuhie | 108—53 |
| 3,095,837 | 7/1963 | Skuhie | 108—53 |
| 3,114,339 | 12/1963 | Bayluk | 108—53 |
| 3,140,673 | 7/1964 | Williams | 108—53 |
| 3,159,116 | 12/1964 | Skuhie | 108—53 |

FOREIGN PATENTS

| 624,082 | 7/1961 | Canada. |
| 1,211,888 | 3/1960 | France. |
| 1,239,012 | 7/1960 | France. |

FRANK B. SHERRY, *Primary Examiner.*

G. O. FINCH, *Assistant Examiner.*